United States Patent [19]

Cordova et al.

[11] Patent Number: 5,260,768
[45] Date of Patent: Nov. 9, 1993

[54] FIBER OPTIC GYRO WITH LOW-BIREFRINGENCE AND PM NETWORKS

[75] Inventors: Amado Cordova, West Hills; George A. Pavlath, Thousand Oaks, both of Calif.

[73] Assignee: Litton Systems, Inc., Woodland Hills, Calif.

[21] Appl. No.: 797,198

[22] Filed: Nov. 25, 1991

[51] Int. Cl.$^5$ .............................................. G01C 19/72
[52] U.S. Cl. ........................................ 356/350; 385/12
[58] Field of Search ................. 356/350, 345; 385/14, 385/12

[56] References Cited

U.S. PATENT DOCUMENTS

| | | | |
|---|---|---|---|
| 4,046,848 | 9/1991 | Udd | 356/350 |
| 4,547,072 | 10/1985 | Yoshida et al. | 356/350 |
| 4,588,296 | 5/1986 | Cahill et al. | 356/350 |
| 4,915,503 | 4/1990 | Pavlath | 356/350 |
| 5,018,859 | 5/1991 | Chang et al. | 356/350 |
| 5,106,193 | 4/1992 | Fesler et al. | 356/350 |

Primary Examiner—Samuel A. Turner
Attorney, Agent, or Firm—Elliott N. Kramsky

[57] ABSTRACT

A fiber optic gyroscope is formed of two distinct sections, one having optical paths of low-birefringence fiber and the other having paths formed of polarization-maintaining (PM) fiber. The two sections are joined at a low-birefringence-PM fiber splice. The PM section includes at least one MIOC and an associated rotation sensing coil of PM fiber while the low-birefringence section includes the optical source, and associated couplers and detectors. The arrangement minimizes polarization fading and polarization non-reciprocity (PNR) bias error while allowing maximum use of lower cost and, in many cases, more durable, components to minimize overall system cost without loss of performance.

22 Claims, 9 Drawing Sheets

FIBER OPTIC GYRO WITH LOW-BIREFRINGENCE AND PM NETWORKS

BACKGROUND

1. Field of the Invention

The present invention relates to optical rotation sensors based on the Sagnac effect, such as fiber optic gyroscopes. More particularly, this invention pertains to fiber optic gyroscopes that incorporate relatively low cost components to thereby minimize system cost without degrading performance.

2. Background of the Prior Art

The measurement of rotation is of considerable importance in many areas ranging from missile and aircraft guidance to spacecraft applications.

The spinning wheel or mechanical gyroscope method has been utilized for many years. Despite wide acceptance, this approach is subject to disadvantages that are known in the navigation-guidance field. These include relatively brief lifetimes due to the continuous motion of component parts and high component cost.

Optical instruments based on the Sagnac effect, such as the ring laser gyroscope, have begun to replace mechanical gyroscopes in many applications. The development of low scatter mirrors and high quality gas discharge tubes for generating laser light have hastened the development of this technology. However, the ring laser gyroscope is subject to the phenomenon of frequency-locking at low rotation rates, which can eliminate the rotation-induced frequency beat at such low rates.

The fiber optic gyroscope has emerged as an alternative to the ring laser gyro that is not subject to the problem of frequency lock-in at low rotation rates. Moreover, the fiber optic gyroscope offers the potential of reduced cost. Accordingly, this instrument may be suitable for large-volume, low and medium accuracy navigation and guidance systems.

Figures 1, 4A:
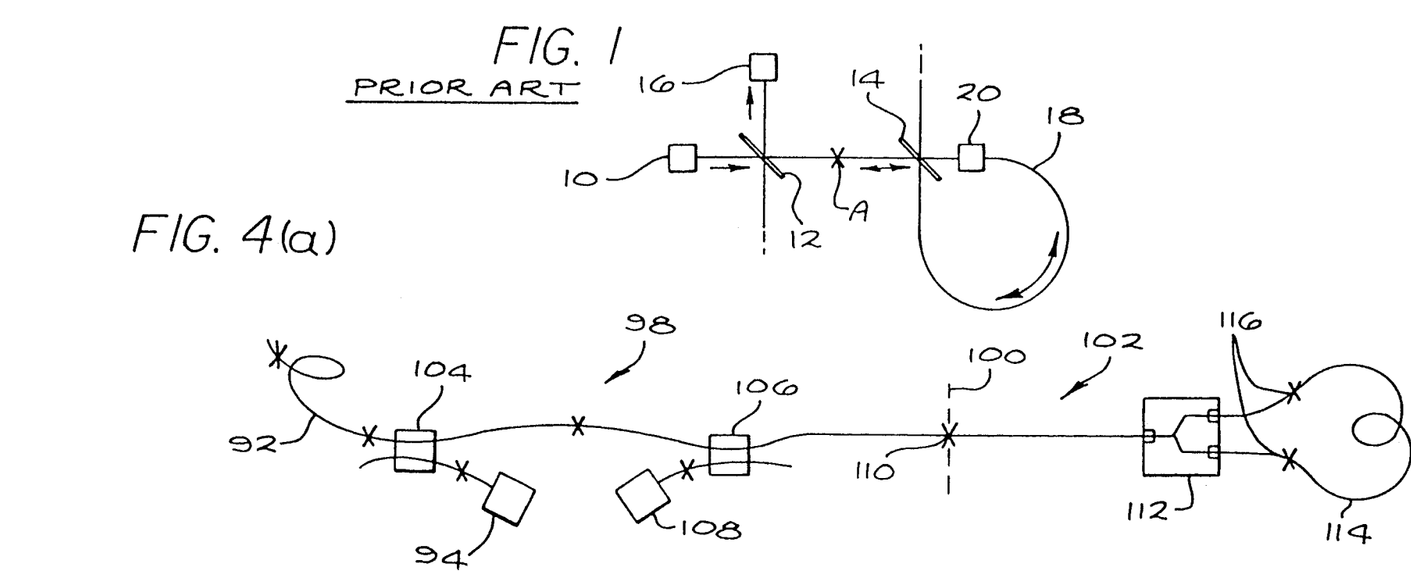
FIG. 1 is a schematic diagram of a low-birefringence fiber optic gyroscope in accordance with the prior art.
FIGS. 4(a) and 4(b) are schematic diagrams of alternative embodiments of a single axis fiber optic gyroscope in accordance with the present invention.

Fiber optic gyroscopes initially employed low-birefringence fiber similar to that used in the optical fiber communications industry. A schematic diagram of a typical low-birefringence fiber optic gyroscope of the prior art is shown in FIG. 1. Such a device comprises a laser diode light source 10, two beam splitters 12 and 14 (or fiber directional couplers) to route the light, a photodetector 16, a multiturn fiber coil 18 that acts as the rotation sensing component, and a phase modulator 20 consisting of either a piezoelectric cylinder or a single-channel $LiNbO_3$ waveguide modulator. The Sagnac phase shift is a relativistic effect that originates from a rotation-induced differential phase shift between counterpropagating waves.

One of the most notorious problems of fiber optic gyroscopes made with low birefringence fiber and low birefringence optical components is a large bias drift due to the random and unpredictable exchanges of power between the fiber's two polarization states. This bias instability, also known as polarization non-reciprocity (PNR) bias error, is briefly described below.

As described by Ezekiel and Arditty in "Fiber Optic Rotation Sensors: Tutorial Review," *Proceedings of First International Conference on Fiber Optic Rotation Sensors, Cambridce, MA* (1981), due to the small magnitude of the Sagnac-induced phase shift in a fiber optic gyro, spurious phase shifts caused by different parasitic effects can easily be orders of magnitude larger than the Sagnac phase shift. The only known way to cancel many of such spurious phase shifts is by employing the so-called "principle of reciprocity." According to this principle, many of such parasitic, unwanted phase shifts, regardless of size, will vanish provided that the counterpropagating waves travel identical optical paths within the sensing loop.

Single mode optical fiber actually exhibits two orthogonal polarization modes. Even though it is always possible to launch light into only one polarization mode of a low-birefringence, single mode fiber, many external birefringence perturbations (such as small lateral forces on the fiber, fiber twist or fiber bending, magnetic or electric fields) will couple power into the orthogonal mode. Consequently, in the prior art fiber optic gyroscope of FIG. 1 it is not possible to insure that the two counterpropagating waves will travel identical optical paths as portions of each wave will travel first in one polarization and then "cross-couple" to the orthogonal polarization. The principle of reciprocity is thus violated, producing polarization non-reciprocity bias (PNR) error.

According to the principle of reciprocity, the introduction of a perfect polarization filter (or polarizer) before the loop coupler (at point A in FIG. 1) will eliminate the PNR bias error. However, the introduction of a polarizer before the loop coupler in an otherwise exclusively low birefringence gyroscope will create another problem known as "polarization fading." Polarization fading is found in low birefringence fiber systems that contain polarizers. Since the state of polarization (SOP) of light in a low birefringence, single mode fiber will fluctuate (due to the previously-mentioned external birefringence perturbations that produce a continuous exchange of power between the two polarization modes), situations will occur where the SOP is orthogonal to the polarizer's transmission axis. The transmitted power in such situations is zero. Thus, large fluctuations of power (as large as 100 percent) occur over time. Polarization fading was alleviated in early fiber optic gyroscopes by periodically adjusting the SOP by hand, using fiber polarization controllers to align it with the polarizer axis. Needless to say, such a stopgap approach is inappropriate for the design of inexpensive, mass-producible devices.

In addition to polarization fading, low-birefringence fiber optic gyroscopes employing a polarizer require unrealistically high-performance polarizers to achieve satisfactory rotation rate sensitivity. It is estimated, for example, that a gyroscope comprising low-birefringence fiber and components requires a polarizer with extinction ratio of about 120 dB to attain navigation grade performance. At present, the best known polarizer has an extinction ratio of about 90 dB. The extinction ratios of low-cost, mass-producible polarizers do not currently exceed 60 to 70 dB.

The problems of polarization fading and polarization non-reciprocity bias error have been greatly alleviated by the introduction of polarization maintaining (PM) fiber and low-coherence or broadband light sources such as superluminescent diodes. See for example W. K. Burns, C. L. Chen and R. P. Moeller, "Fiber-Optic Gyroscopes with Broadband Sources," *J. Lightwave Tech.*, Vol 1, No. 98, (1983). PM fiber is designed so that the SOP of light launched into one of the fiber polarization modes is substantially conserved over long sections of fiber (hundreds of meters or kilometers) despite the presence of external birefringence perturbations. Polarization fading basically disappears as the light's SOP is significantly aligned at all times with the polarizer transmission axis. The PNR bias error is greatly reduced because the low coherence of the light source in conjunction with the high birefringence of the PM fiber, greatly reduces the correlation between the different parasitic cross-coupled waves and the primary waves.

The use of PM fiber and components has entailed substantially increased cost in terms of both fiber and fiber component fabrication. PM fiber and PM couplers are far more costly to manufacture than their low-birefringence counterparts as the manufacture of PM couplers, for example, requires a costly alignment step.

Furthermore, a scale factor error can result if the average wavelength of the light source is not stable over changing temperatures. The average wavelength must be very stable with respect to the environment in a fiber optic gyroscope and it can be greatly affected for example by the temperature-dependence of the coupler split ratio. Prior designs have not addressed this problem in the past for systems employing PM or low-birefringence components.

Another approach that reduces both polarization fading and PNR bias error with a low birefringence fiber sensing coil is described by Ulrich in "Polarization and Depolarization in the Fiber Optic Gyroscope," *First International Conference on Fiber Optic Rotation Sensors, Cambridge, Ma* (1981). Ulrich discloses the principle of depolarization or polarization "averaging." According to Ulrich, if all possible SOP's of the low birefringence fiber are present during the gyroscope detector integration time, a stable polarization average is produced. A practical wa to achieve depolarization or polarization averaging is by means of a Lyot depolarizer in conjunction with a broadband light source as discussed by R. E. Epworth in "The Temporal Coherence of Various Semiconductor Light Sources Used in Optical Fiber Sensors."*Ibid.* Another reference on Lyot depolarizers is W. K. Burns, "Degree of Polarization in the Lyot Depolarizer," J. Lightwave Tech., Vol 1, p. 475 (1983) and such references are hereby incorporated by reference. A depolarized fiber optic gyroscope is disclosed in U.S. Pat. Ser. No. 4,828,389 of Gubbins et al. covering "Integrated Triad Optical Rate Sensor Apparatus," and the concept is further discussed in the article of J. L. Page entitled "Multiplexed Approach for the Fiber Optic Gyro Inertial Measurement Unit," *SPIE Proceedings on Fiber Optic and Laser Sensors* Vol 8, pgs. 93 through 102 (1990).

While the depolarized gyroscope is useful in low accuracy applications (5 to 50 deg/hr. minimum rotation sensitivity), it is questionable whether it can achieve the degree of accuracy required, for example, in inertial navigation, avionics attitude and heading reference and missile guidance applications (0.003 to 1.0 deg/hr. minimum rotation sensitivity) due to the limitations of present day polarizers and depolarizers.

SUMMARY OF THE INVENTION

The present invention overcomes the preceding shortcomings of the prior art by providing an improvement in a fiber optic gyroscope of the type that includes a light source, at least one photodetector, at least one sensing coil of optical fiber and at least one modulator. The improvement in such apparatus provided by the gyroscope of the present invention lies in the utilization of both low-birefringence and polarization maintaining (PM) components, the sensing coil being of PM fiber composition.

The foregoing and additional features and advantages of the present invention will become further apparent from the detailed description that follows. Such description is accompanied by a set of drawing FIGURES. Numerals of the drawing FIGURES, corresponding to those of the written description, point to the features of the invention. Like numerals refer to like features throughout both the drawings and the written description.

BRIEF DESCRIPTION OF THE DRAWINGS

FIGS. 6(a)1 and 2 and 6(b)1 and 2 are pairs of graphs for illustrating gyro scale factor stability, (temperature constant (FIG. 6(a)) and temperature variable (FIG. 6(b))), over time for a gyro in accordance with the invention.

DETAILED DESCRIPTION

Figure 2:
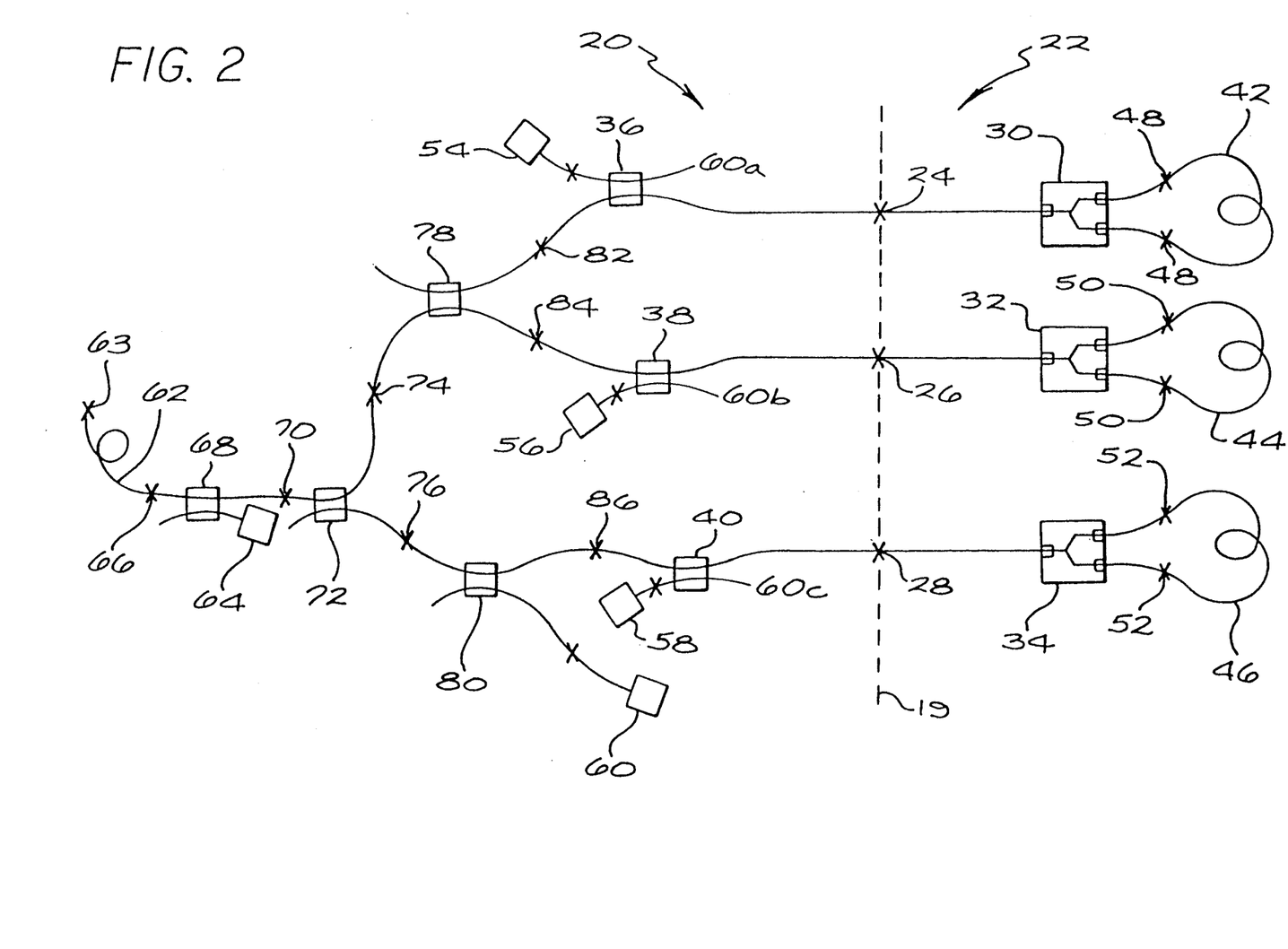
FIG. 2 is a schematic diagram of a triaxial fiber optic gyroscope in accordance with the present invention.

Referring once again to the drawing FIGURES, FIG. 2 is a schematic diagram of a triaxial fiber optic gyroscope in accordance with the invention. It will be seen from the discussion to follow that the apparatus of FIG. 2, which incorporates the teachings of the present invention into an otherwise-conventional triaxial gyro system, achieves comparable performance to a system configured exclusively of polarization maintaining (PM) fiber and couplers at substantially reduced cost. Such economy is due to the selective incorporation of relatively inexpensive low-birefringence fiber and couplers into the system. It will be apparent from the discussion that follows that the teachings of the present invention are not limited to a triaxial device. While a greater number of components is inherent in a triax than in a single axis system and, thus, greater potential component cost savings are presented, the principles of the invention may be successfully applied to systems employing any number of gyros.

The gyroscope of FIG. 2 is divided at 19 into a section 20 fabricated of low-birefringence components and a section 22 formed of more-costly PM components. The two sections are joined at fusion splices (indicated by "x") 24, 26 and 28 that connect the input pigtails of multifunction integrated optics chips (MIOC's) 30, 32 and 34 to multiplexing directional couplers 36, 38 and 40 respectively. The couplers 36, 38 and 40 are conventional devices formed of fused pairs of low-birefringence optical fibers while the input pigtails of the chips 30, 32 and 34 comprise PM optical fiber.

The MIOC's (or chips) 30, 32 and 34 are well-known devices, each preferably comprising a substrate of an appropriate electro-optic material such as $LiNbO_3$ for effecting predetermined phase shifts between counter-propagating beam pairs that emerge from PM waveguide Y-junctions formed thereon. The PM optical fiber output pigtails from the MIOC's 30, 32 and 34 are joined to sensing coils 42, 44 and 46 of PM optical fiber by pairs of splices 48, 50 and 52 respectively. As an alternative, the coils 42, 44 and 46 could be directly "pigtailed" to the MIOC's 30, 32, and 34, rendering splices 48, 50 and 52 unnecessary and thereby further reducing system costs.

Returning to section 20, each optical path thereof is formed of low-birefringence fiber. The term "low birefringence" fiber refers to its relatively-small anisotropy. That is, the transverse indices of refraction of such fiber do not differ significantly. This is in contrast to PM fiber whose indices of refraction (associated with the slow and fast axes) are significantly different. It is the above-described property of PM fiber that is at the core of its ability to preserve the SOP of light.

The section 20 includes photodetectors 54, 56, 58 and 60 (each having an associated pigtail of low-birefringence fiber joined at a splice to a low-birefringence coupler pigtail), the first three of which serve to measure the signal outputs of the coils 42, 44 and 46. Each of such coils is preferably arranged to provide an indication of rotation about one of three orthogonal space axes. The fourth detector 60 acts as a monitor, providing a signal for measuring the output power of a broadband unpolarized fiber source 62. (Detector 60 might be alternatively positioned at one of the locations indicated at 60a, 60b and 60c.) The detector 60 functions as part of a control system for regulating the output power of the source 62 by adjusting a laser diode 64. The arrangement of the aforementioned control circuit is well known and, as it does not form a portion of the invention claimed herein, such circuit is not illustrated in detail in FIG. 1. (As illustrated, the laser diode 64 is in a backward pumping configuration. This is advantageous as it greatly reduces the potential transmission of non-absorbed pump light to the gyro sensor coils. Such unintended transmissions of light could induce bias and scale factor errors.)

The broadband fiber source 62 preferably comprises an Erbium-doped fiber that is joined at a splice 66 to a pigtail of a low-birefringence wavelength-division multiplexing (WDM) coupler 68. The end 63 of this fiber is fabricated to avoid the reflection of light back into the fiber. The coupler 68 is joined at a splice 70 to a low-birefringence coupler 72. Pigtails of the coupler 72 are joined at splices 74 and 76 to pigtails of low-birefringence directional couplers 78 and 80 respectively. Splices 82, 84 and 86 complete the optical pathways between the couplers 78 and 80 and the couplers 36, 38 and 40 mentioned earlier. Couplers 72, 78 and 80 operate as power splitting couplers. Such a network could be replaced by a single coupler of, for example, 3:1 or 4:1 splitting ratio.

Figure 3:
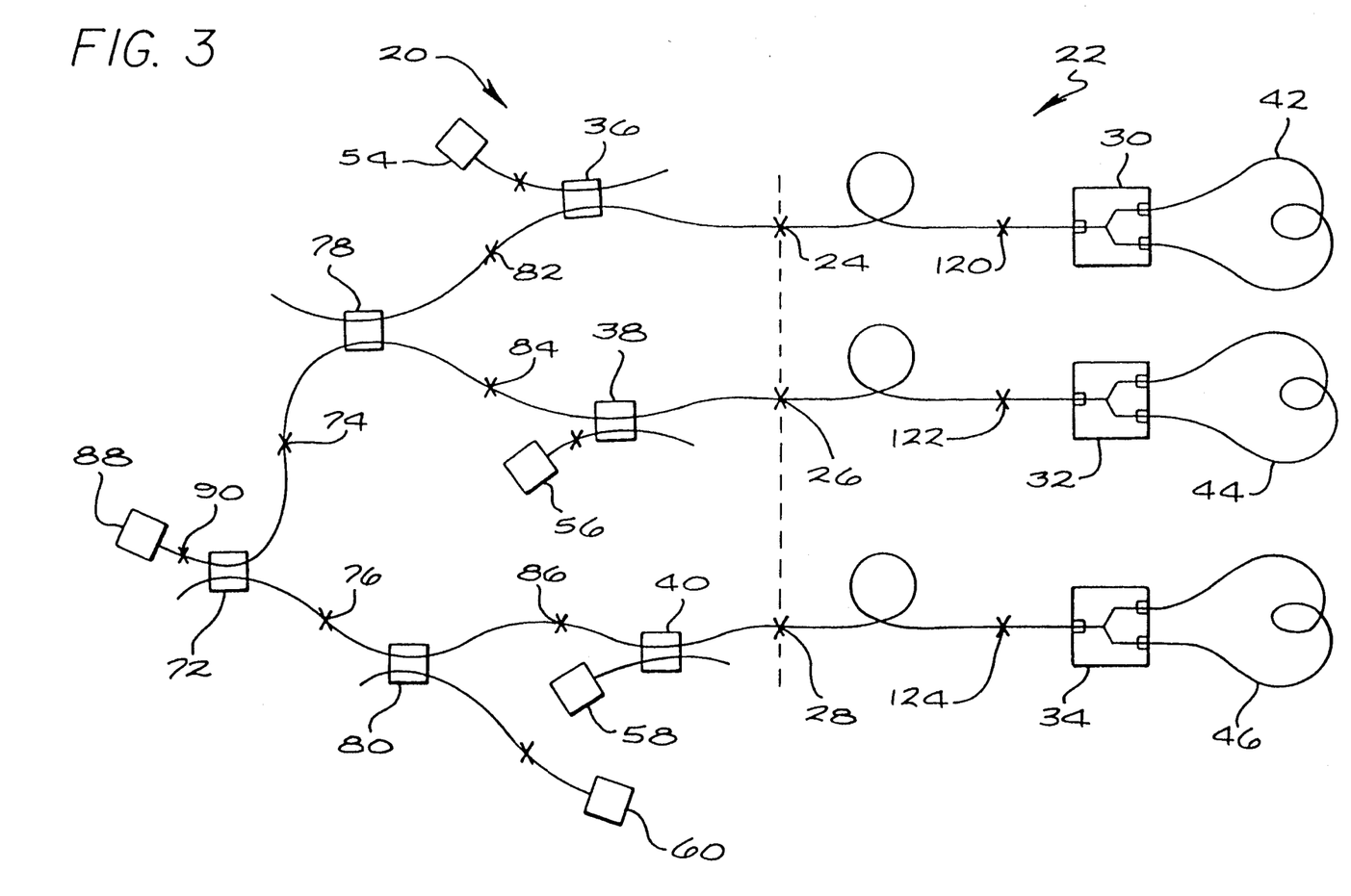
FIG. 3 is a schematic diagram of a triaxial fiber optic gyroscope in accordance with an alternative embodiment of the invention.

It is well-recognized that a broadband fiber source such as Er-doped low-birefringence optical fiber pumped by a laser diode emits unpolarized light. An alternative embodiment of the invention that employs a polarized light source is shown in FIG. 3. In this FIGURE elements corresponding to those of the prior embodiment are indicated by corresponding numerals. As mentioned, unlike the prior embodiment the arrangement of FIG. 3 does not employ an unpolarized light source. Rather, the gyro of FIG. 3 employs a polarized source of light 88, such as a low-coherence laser diode or a superluminescent diode. The source 88 has an associated PM pigtail that is joined to the low-birefringence pigtail of the coupler 72 at a splice 90. Since a pumping diode is not required, the overall system design is slightly reconfigured by elimination of the WDM 68 of FIG. 2.

Lyot depolarizers 120, 122 and 124 are introduced into the PM fiber segments that connect the splices 24, 26 and 28 to the MIOC's 30, 32 and 3 respectively. A Lyot depolarizer may comprise either a stack of birefringent materials arranged to satisfy the conditions of phase retardation required for operation or may consist of a PM fiber splice at precisely forty-five (45) degrees. The operation of a Lyot depolarizer is described in the Burns and in the Epworth articles referenced art attempts (e.g. U.S. Pat. Ser. No. 4,828,839) to integrate PM and low-birefringence components into fiber optic triax systems have required placement of Lyot depolarizers inside the sensing loops, unlike the present invention in which the depolarizer is placed outside the coil and is limited in use to a polarized light source.

The inventor has found that a system configured in accordance with FIGS. 2 or 3 (or a like single axis arrangement) can achieve performance comparable to systems exclusively empolying relatively-expensive PM fiber and couplers. This is due, in part, to the fact that, by employing a section of exclusively low-birefringence elements, the analysis of the system and, consequently, the design section 20 of the gyro system may be treated as a single-polarization cross-coupling point for bias error analysis. As a result, (1) the fiber lead lengths of low-bifringence components are not relevant to polarization non-reciprocity error calculations and (2) the number of possible polarization non-reciprocity bias error term in the system is significantly reduced. This derives from the inherently differing natures of the parasitic waves generated in low-birefringence and PM fibers. While such parasitic waves give rise to polarization non-reciprocity errors in both types of fibers and elements, the small degree of anisotrophy of low-birefringence fiber assures that, no matter how much cross-coupling occurs along a low-birefringence optical path, the cross-coupled power will be coherent or correlated throughout. Accordingly, despite discontinuities and the like that can give rise to cross-coupling along a low-birefringence optical path, no more than four (4) distinct waves will be generated and observed on any of the low-birefringence optical fibers that transmit light in the (low-birefringence) section 20. This is unlike the case of PM fiber and elements wherein each cross-coupling from the fast axis to the slow axis or vice versa produces a parasitic wave that quickly decorrelates (or becomes incoherent) with respect to the launching wave. The four distinct waves present at each low-birefringence optical path include two orthogonally polarized waves, A and B, generated by the light source. (A, B uncorrelated if the source is unpolarized.) A wave orthogonally-polarized with respect to A and one orthogonally polarized with respect to B result from cross-couplings along the low-birefringence path. Each of the last-named waves, A' and B', is nearly perfectly correlated with its corresponding generating wave (A or B).

Mathematically, one can contrast the above-referenced situation wherein one must deal analytically with only four waves per low-birefringence optical path, with the $2^n$ distinct (not correlated) waves generated within a PM optical path where n is the number of cross-couplings and consequent launches of parasitic waves within the purely PM optical path. Such coupling may be either discrete (due to the presence of splices, pigtails, Y-junctions and couplers), or continuous ("distributed") due to the presence of irregularities in the fiber and/or the LiNbO₃ crystal along the optical path, further complicating a alysis efforts.

Thus, in addition to reducing the cost of materials, the elimination of some PM elements simplifies the analysis required for system design. Accordingly, a further economic savings is realized as the designer may treat the low-birefringence section 20 as "lumped" for purposes of analysis and focus his attention (in terms of fiber lengths, element separations and the like) solely upon the arrangement of the PM section 22. Also, by employing either an unpolarized light source or a polarized source coupled with a depolarizer, problems associated with polarization fading are minimized in the invention.

Figure 4B:
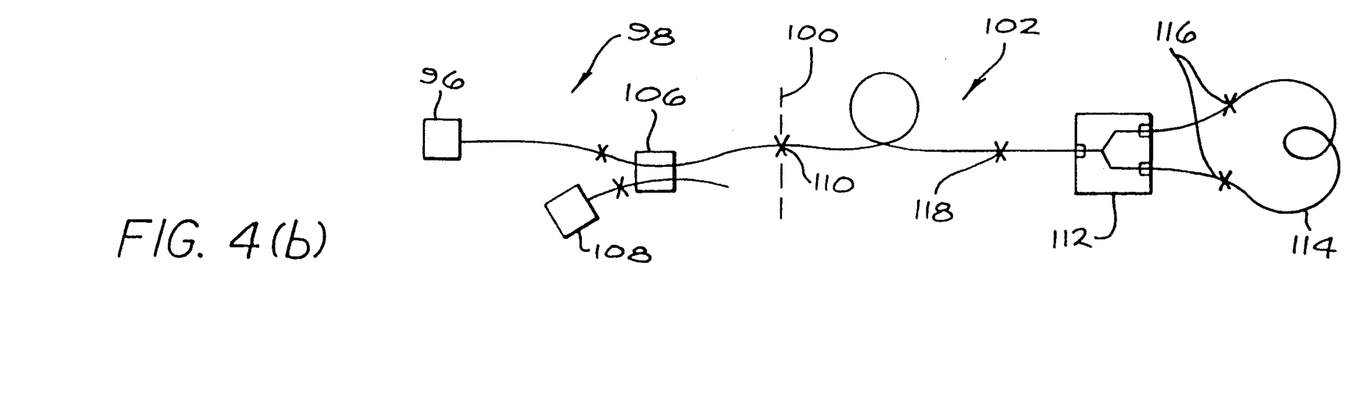

FIGS. 4(a) and 4(b) are schematic diagrams of single axis gyroscopes in accordance with the invention. The gyroscope of FIG. 4(a) employs a broadband light source such as an Er-doped fiber 92 pumped by a laser diode 94. As discussed earlier, such an arrangement is known to produce unpolarized light. In FIG. 3(b), a laser diode 96 emits polarized light. Generally, the arrangements of FIGS. 4(a) and 4(b) correspond to the triaxial arrangements of FIGS. 2 and 3, respectively.

Returning to FIG. 4(a), the single-axis gyroscope is divided into distinguishable "sections", a section 98 to the left of 100 comprising low-birefringence elements and a section 102 to the right of 100 comprising PM elements. As in the prior discussion, optimum design is simplified by the invention insofar as the selection of fiber lengths, etc. can be done by focusing on the arrangement of the PM section 102. As before, the section 98 is equivalent to a single-polarization cross-coupling point for purposes of bias error analysis.

Economies are achieved in the section 98 by the use of low-birefringence couplers 104 and 106, the coupler 104 enabling the pumping diode 94 to excite the doped fiber 92 and the coupler 106 connecting the photodiode 108 to the gyro system. All splices to the left of 100 interconnect low-birefringence fiber pigtails while the splice 110 joins a pigtail of the low-birefringence coupler 106 to the PM input pigtail of an MIOC 112. The output pigtails of the chip 112 are joined to a PM fiber sensing coil 114 by a pair of splices 116. As previously stated, this pair of splices is not necessary if the coil is directly pigtailed to the chip 112.

The single axis gyroscope of FIG. 4(a), while incorporating the teachings and advantages of the present invention, performs essentially the same as an exclusively-PM single axis gyroscope. However, the system of FIG. 4(a) achieves substantial savings by replacing a pair of PM couplers with the low-birefringence couplers 104 and 106. While such a cost saving is indeed less impressive than that realized in a triaxial device in accordance with the invention (the device of FIG. 2 replaces seven (7) PM couplers with low-birefringence counterparts), the savings realized in terms of lower component costs and simplified overall design are not insignificant.

The single axis gyroscope of FIG. 4(b) differs from that of FIG. 4(a) in much the same way that the triaxial gyro of FIG. 3 differs from that of FIG. 2. That is, the source 96 emits polarized light and, thus, a Lyot depolarizer 118 is required as in the triaxial version, the depolarizer 118 being located in the PM section 102. As mentioned earlier, polarization filtering of the light beams must take place within a fiber optic gyroscope before the beams enter the sensing loop and after they have exited the loop to assure a pair of counterpropagating beam modes in which each mode has "seen" the same optical path (principle of reciprocity). In the present invention, the sensing coil 114 and the output pigtails of the MIOC are of PM fiber. This is unlike prior art attempts to mix PM and low-birefringence fiber inside the sensing loop such as that disclosed, for example, in the above-identified United States patent that employs low-birefringence sensing coils and requires insertion of Lyot depolarizers into such coils. Rather, the inventors have utilized only PM fiber in the rotation sensing portion of the gyro.

Figure 5A:
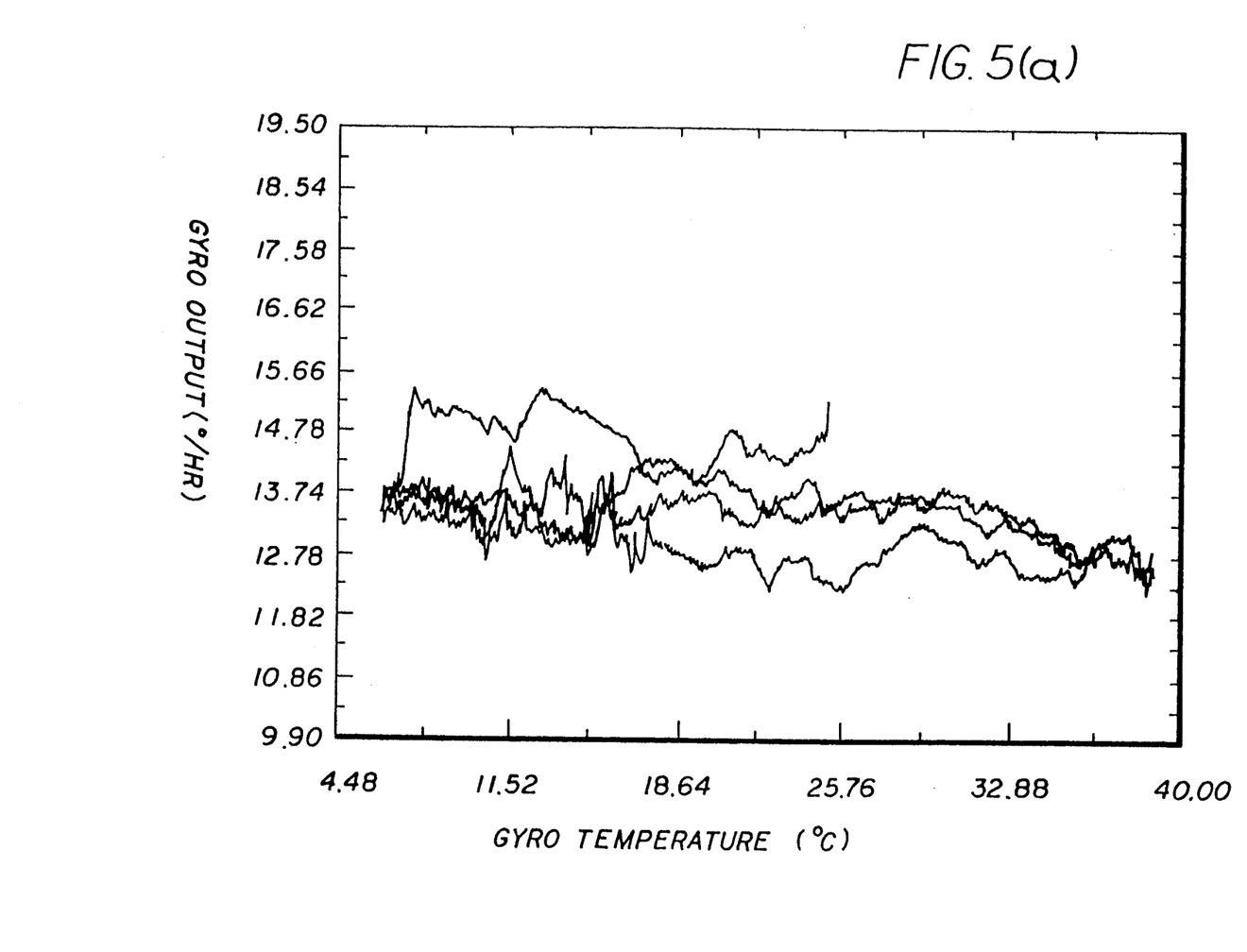
FIGS. 5(a) and 5(b) are graphs of bias uncertainty data versus temperature for a single axis gyroscope of PM fabrication and in accordance with the invention respectively.
Figure 5B:
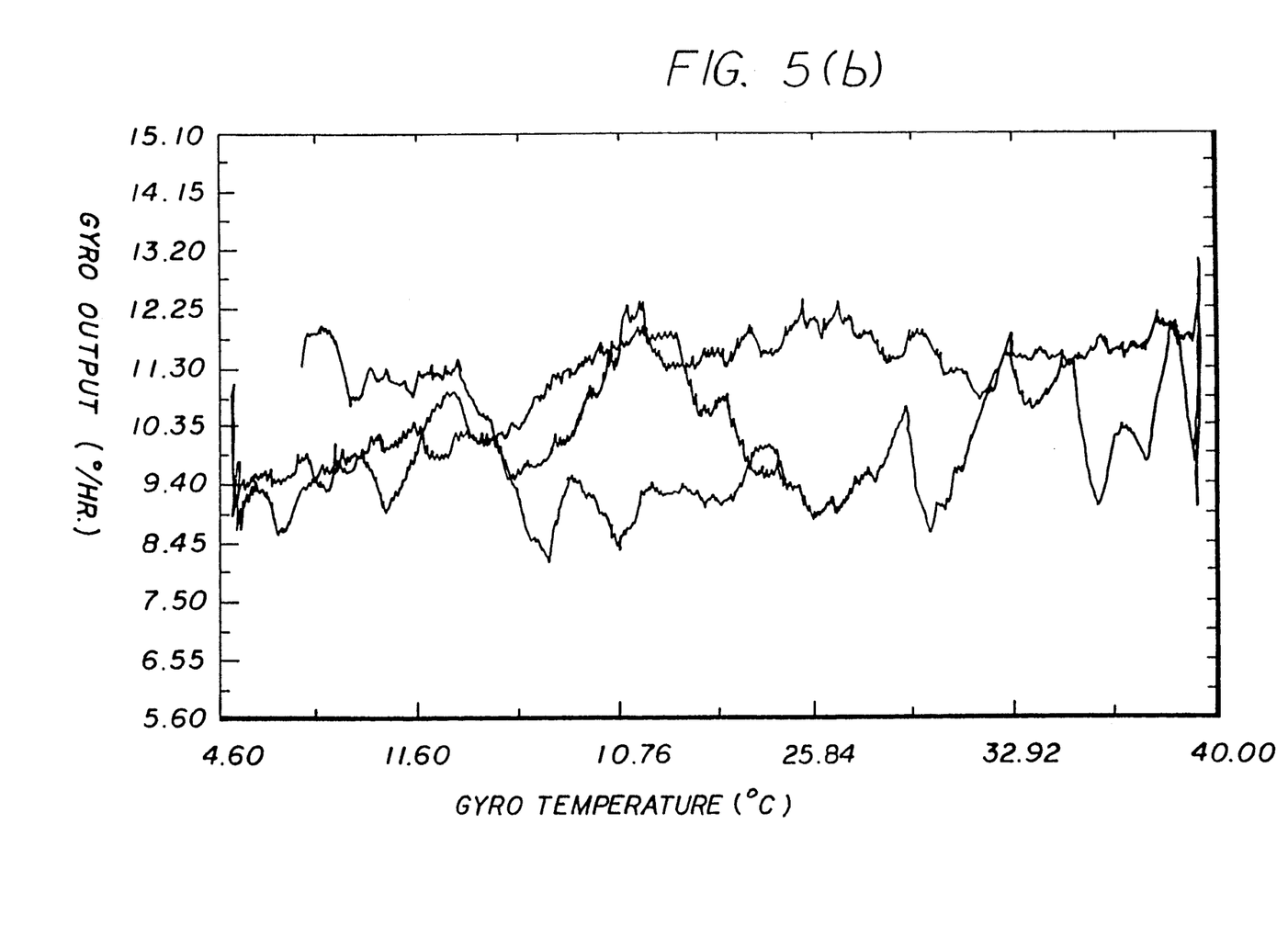

As mentioned earlier, the invention achieves a level of performance that is substantially indistinguishable from much higher cost systems formed exclusively of PM fiber and PM fiber couplers. FIG. 5(a) is a graph of bias uncertainty data as a function of temperature for a single axis 0.8 micron gyroscope employing a standard PM coupler while FIG. 5(b) is a graph of results obtained with a single axis gyroscope in accordance with the invention and employing a low-birefringence coupler. A polarized light source (superluminescent diode) was utilized in conjunction with a Lyot depolarizer. A standard deviation of 0.61 degrees per hour was observed in the PM gyro and an only somewhat-greater variability of 1.07 degrees per hour was found to exist in the output of the single axis gyro of the invention.

Figure 6A:
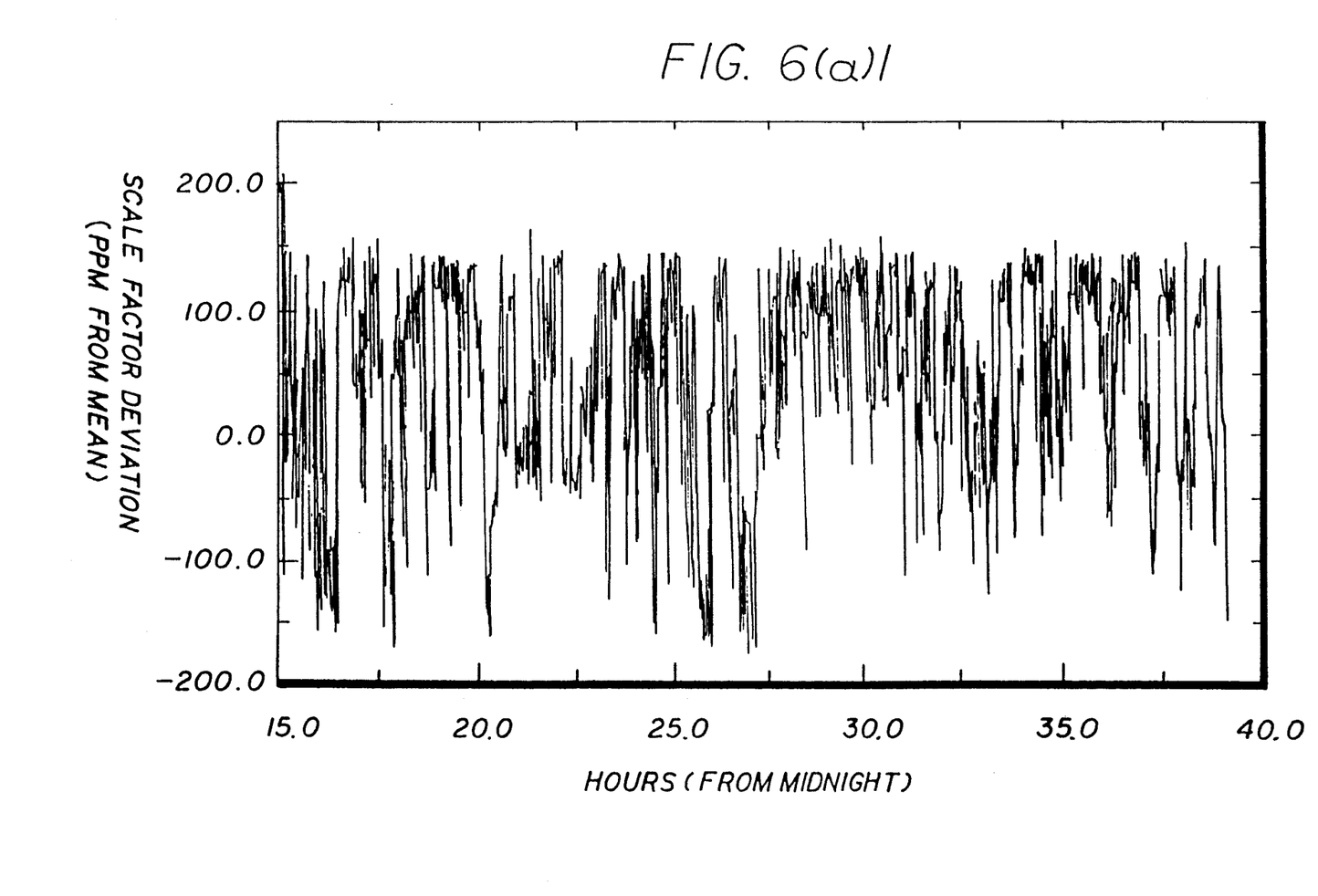
Figure 6B:
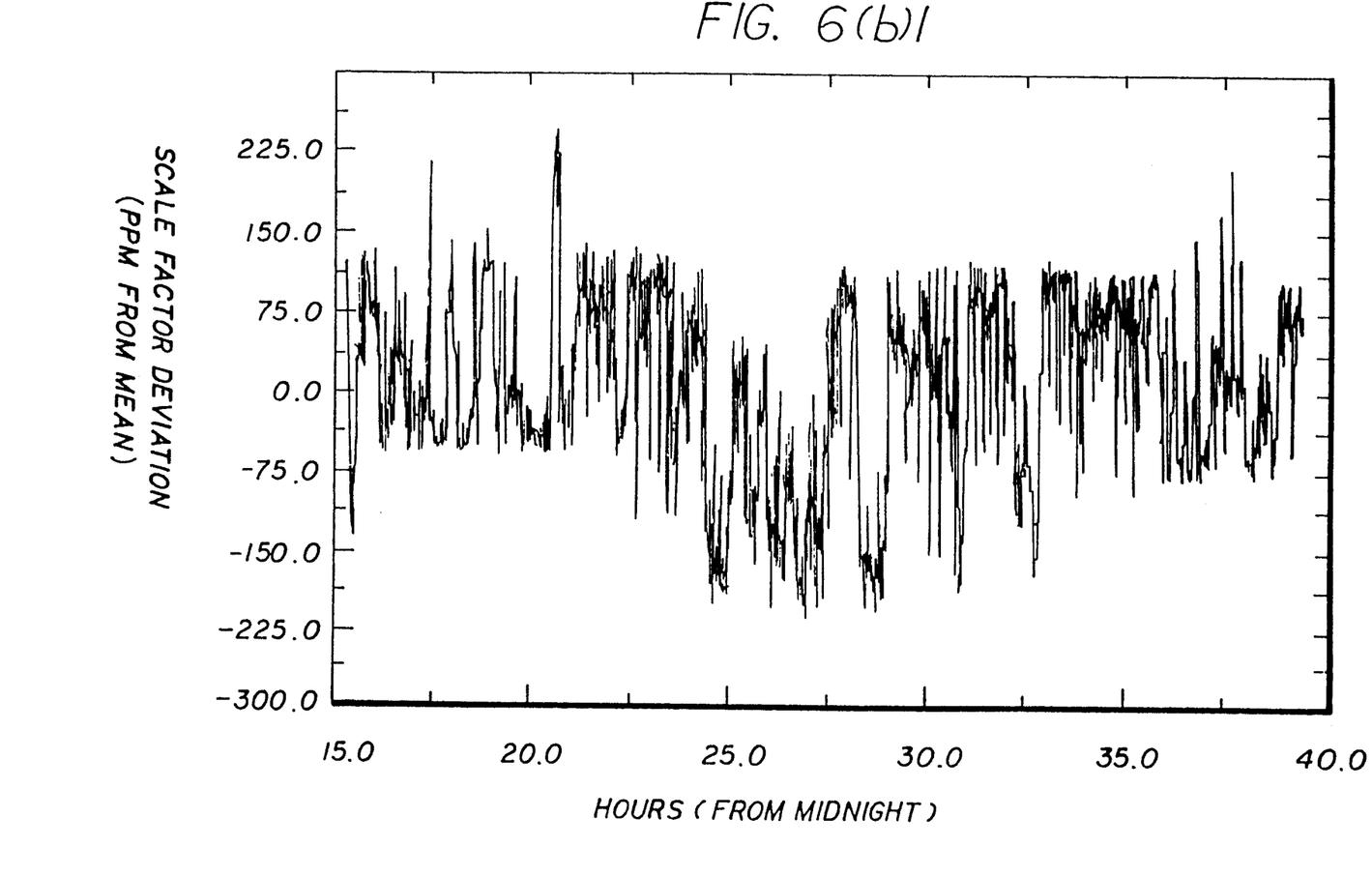

FIGS. 6(a)1 and 2 (temperature constant) and 6(b)1 and 2 (temperature variable) are graph pairs that display gyro scale factor stability over time for a 1 km gyro utilizing a broadband (unpolarized) fiber source and three low-birefringence couplers. The scale factor stability data of FIG. 6(a)1 was taken while the coupler temperature was maintained nearly constant as shown in FIG. 6(a)2. The data of FIG. 6(b)1 was taken as coupler temperature was cycled between 15 and 35 degrees Centigrade as shown in FIGS. 6(b)2. The large number of spikes in both of FIGS. 6(a)1 and 6(b)1 may be attributed to the closed-loop electronics implemented for the experimental measurement. A standard deviation of about 90 ppm is observed in the graphs of both FIGS. 6(a)1 and 6(b)1. The data of FIG. 6(b)1 is essentially indistinguishable from that of FIG. 6(a)1 despite the coupler temperature profile.

Thus, as can be seen, the present invention provides fiber optic gyroscopes of enhanced economy without degradation of performance. By utilizing the teachings of this invention, one may obtain performance comparable to that available in systems that utilize PM fiber and couplers exclusively. By employing a broadband light source and making use of the analysis or modeling made possible by the appropriate segregation of PM and low-birefringence components in accordance with the invention, the problems associated with polarization fading and polarization non-reciprocity (PNR) bias error as well as scale factor error are minimized while the resultant device is arguably more durable than much more expensive prior art devices.

While this invention has been disclosed with reference to its presently preferred embodiment, it is not limited thereto. For example, while illustrated with respect to single and triaxial embodiments, it will be opponent to those skilled in the art that this invention maybe extended to four, six and other multi-axis systems in a straight forward manner based upon the teachings herein. This invention is thus limited only insofar as defined by the following set of patent claims and includes within its scope all equivalents thereof.

What is claimed is:

1. In a fiber optic gyroscope of the type that includes a light source, at least one photodetector, at least one sensing coil of optical fiber and at least one multifunction integrated optical chip that includes a y-junction waveguide, said chip being formed on a LiNbO$_3$ substrate, the improvement comprising;
   a) said low birefringence components including both low-birefringence and polarization-maintaining (PM) components;
   b) said low birefringence components including at least one coupler;
   c) said sensing coil and the input and output pigtails of said optical chip being of PM fiber composition; and
   d) said gyroscope is arranged into two distinct sections, a first section including said light source and having at least one low birefringence optical path and a second section including at least one sensor coil and having at least one PM optical path.

2. A fiber optic gyroscope as defined in claim 1 wherein said light source emits unpolarized light.

3. A fiber optic gyroscope as defined in claim 2 wherein said light source further comprises:
   a) a low-birefringence fiber of predetermined dopant; and
   b) a laser diode, said laser diode being arranged to pump said last-named fiber whereby unpolarized light is emitted therefrom.

4. A fiber optic gyroscope as defined in claim 3 wherein said predetermined dopant is Erbium.

5. A fiber optic gyroscope as defined in claim 1 wherein said light source emits polarized light.

6. A fiber optic gyroscope as defined in claim 5 wherein said light source is a low temporal coherence laser diode.

7. A fiber optic gyroscope as defined in claim 5 wherein said light source is a superluminescent diode.

8. A fiber optic gyroscope as defined in claim 5 further including a Lyot depolarizer.

9. A fiber optic gyroscope as defined in claim 8 wherein:
   a) said modulator is a multifunction integrated optical chip (MIOC) that includes a y-junction waveguide; and
   b) said Lyot depolarizer is joined to the input pigtail of said optical chip.

10. A fiber optic gyroscope as defined in claim 1 wherein said first and second sections are joined by means of at least one low-birefringence-to-PM fiber splice.

11. A fiber optic gyroscope as defined in claim 10 wherein said second section further includes:
   a) an MIOC; and
   b) said sensor coil is joined to the output pigtails of said MIOC.

12. A fiber optic gyroscope as defined in claim 11 further characterized in that:
   a) said first section includes seven low-birefringence couplers and an unpolarized light source; and
   b) said second section includes three optical chips and three sensing coils arranged to measure rotation rates about three orthogonal axes.

13. A fiber optic gyroscope as defined in claim 11 further characterized in that:
   a) said first section includes five low-birefringence couplers; and
   b) said second section includes three optical chips and three sensing coils arranged to measure rotation rates about three orthogonal axes.

14. A fiber optic gyroscope as defined in claim 11 further characterized in that:
   a) said first section includes seven low-birefringence couplers and an unpolarized light source;
   b) said second section includes three optical chips and three sensing coils arranged to measure rotation rates about three orthogonal axes.
   c) three Lyot depolarizers are located in said second section, each of said depolarizers being positioned intermediate the input pigtail of said optical chip and a segment of PM fiber.

15. A fiber optic gyroscope as defined in claim 11 further characterized in that:
   a) said first section includes two low-birefringence couplers and an unpolarized light source; and
   b) said second section includes an optical chip and sensing coil arranged to measure rotation rate.

16. A fiber optic gyroscope as defined in claim 11 further characterized in that:
   a) said first section includes six low-birefringence couplers and a polarized light source:
   b) said second section includes an optical chip and a sensing coil arranged to measure rotation rate; and
   c) a Lyot depolarizer is located in said second section and positioned intermediate the input pigtail of said chip and a segment of PM fiber.

17. A fiber optic gyroscope as defined in claim 10 wherein said second section further includes:
   a) an optical chip: and
   b) said sensor coil comprises a continuous optical fiber that includes the output pigtails of said optical chip.

18. A fiber optic gyroscope as defined in claim 10 further characterized in that:
   a) said first section includes seven low-birefringence couplers and an unpolarized light source; and
   b) said second section includes three optical chips and three sensing coils arranged to measure rotation rates about three orthogonal axes.

19. A fiber optic gyroscope as defined in claim 17 further characterized in that:
   a) said first section includes five low-birefringence coupler; and
   b) said second section includes three optical chips and three sensing coil arranged to measure rotation rates about three orthogonal axes.

20. A fiber optic gyroscope as defined in claim 17 further characterized in that:
   a) said first section includes six low-birefringence couplers and a polarized light source:
   b) said second section includes three optical chips and three sensing coils arranged to measure rotation rates about three axes; and
   c) three Lyot depolarizers are located in said second section, each of said depolarizers being positioned intermediate the input pigtail of said optical chip and a segment of PM fiber.

21. A fiber optic gyroscope as defined in claim 17 further characterize in that:
   a) said first section includes two low-birefringence couplers and an unpolarized light source; and b) said second section includes an optical chips and sensing coil arranged to measure rotation rate. rotation rates about three orthogonal axes.

22. A fiber optic gyroscope as defined in claim 17 further characterized in that:

a) said first section includes a low-birefringence couplers and a polarized light source;
b) said second section includes an optical chip and a sensing coil arranged to measure rotation rate; and
c) a Lyot depolarizer are located in said second section and positioned intermediate the input pigtail of said chip and a segment of PM fiber.

* * * * *

UNITED STATES PATENT AND TRADEMARK OFFICE
CERTIFICATE OF CORRECTION

PATENT NO. : 5,260,768
DATED : November 9, 1993
INVENTOR(S) : Amado Cordova and George A. Pavlath It is certified that error appears in the above-identified patent and that said Letters Patent is hereby corrected as shown below:

Column 3, line 33, delete "wa" and insert therefor --way--;

Column 6, line 12, after "referenced", insert --earlier. Prior--;

Column 6, line 32, delete "term" and insert therefor --terms--;

Column 9, line 10, delete "low birefringence components" and insert therefor --gyroscope--.

Signed and Sealed this

Nineteenth Day of July, 1994

Attest:

BRUCE LEHMAN

Attesting Officer   Commissioner of Patents and Trademarks